US009091087B2

(12) United States Patent
Watford

(10) Patent No.: US 9,091,087 B2
(45) Date of Patent: Jul. 28, 2015

(54) CONFIGURABLE ELEVATED STAND

(71) Applicant: Roger Watford, Galveston, TX (US)

(72) Inventor: Roger Watford, Galveston, TX (US)

(*) Notice: Subject to any disclaimer, the term of this patent is extended or adjusted under 35 U.S.C. 154(b) by 31 days.

(21) Appl. No.: 14/109,721

(22) Filed: Dec. 17, 2013

(65) Prior Publication Data
US 2015/0167325 A1   Jun. 18, 2015

(51) Int. Cl.
E04G 1/15 (2006.01)
A01M 31/02 (2006.01)
E06C 5/02 (2006.01)
E04G 1/24 (2006.01)

(52) U.S. Cl.
CPC .................. *E04G 1/15* (2013.01); *A01M 31/02* (2013.01); *E04G 1/24* (2013.01); *E06C 5/02* (2013.01); *E04G 2001/242* (2013.01)

(58) Field of Classification Search
CPC .............................. A01M 31/02; A01M 31/025
See application file for complete search history.

(56) References Cited

U.S. PATENT DOCUMENTS

| 3,220,766 | A | * | 11/1965 | Kates .................. 297/184.16 |
| 4,045,040 | A |   | 8/1977  | Fails |
| 5,009,284 | A | * | 4/1991  | Authement, Sr. ............. 182/142 |
| 5,295,556 | A |   | 3/1994  | Mullin |
| 6,186,271 | B1 | * | 2/2001 | Borries et al. .................. 182/20 |
| 6,688,635 | B1 |   | 2/2004 | Watts |
| 7,188,844 | B2 |   | 3/2007 | Hinds |
| 7,967,325 | B1 |   | 6/2011 | Burton et al. |
| 2005/0034921 | A1 | * | 2/2005 | Griffiths ......................... 182/20 |
| 2005/0224288 | A1 | * | 10/2005 | Chesness et al. ............. 182/115 |
| 2007/0164537 | A1 |   | 7/2007 | Lee |
| 2007/0235255 | A1 | * | 10/2007 | Wallace et al. ................. 182/20 |

* cited by examiner

Primary Examiner — Alvin Chin-Shue
(74) Attorney, Agent, or Firm — Royston Rayzor Vickery & Williams LLP; William P Glenn, Jr.

(57) ABSTRACT

The present invention is directed at a stand that can elevate a user above the ground at a desired location and also be reconfigured into a two wheel cart which can be pulled or pushed by a user or a transporter (like an all terrain vehicle.) A pair of wheels are mounted on a "U" shaped split axle assembly wherein a ladder assembly and a pair of legs are each coupled to one of the wheels to form an elevated base when the footings of the ladder assembly and the pair of legs are in contact with the ground. Once the base is erected, a seat is fixed to the inside of the "U" shaped split axle assembly below the free wheel to form a covered seat assembly. A user gains access to or egresses from the base by the ladder assembly. The elevated stand can be reconfigured into a cart by uncoupling the legs and ladder assembly from the base and repositioning the split axle assembly such that both wheels are in rolling contact with the ground. The ladder assembly is repositioned and fixed to the split axle assembly to form a frame capable of holding cargo between the pair of wheels.

11 Claims, 4 Drawing Sheets

CONFIGURABLE ELEVATED STAND

CROSS-REFERENCES TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING not Applicable

BACKGROUND OF INVENTION (1) Field of Invention

The present invention relates generally to stands to elevate a user above the ground. More particularly, the present invention relates to stands that can be utilized outdoors on uneven ground to elevate a user, like a hunter, scientist or photographer, above the ground.

(2) Background of Invention

Present stands are designed to be transported to, assembled, used, disassembled and transported from user defined locations. Typically this requires the parts of a stand or the stand itself to be carried by the user to the desired location. If the desired location is difficult to reach (due to distance or the type of terrain), the outdoor stand parts must be packed or transported in as cargo, just like an ice chest, tent or other outdoor equipment. All of which may force the user to make multiple trips, use a bigger transporter and/or more transporters. The present invention overcomes these limitations by configuring the parts of the present novel elevated stand to function as a two wheel cart which can be pulled (or pushed) by a user or a transporter (such as an all terrain vehicle) without the need of removing or adding wheels. In such a configuration, the present novel elevated stand increases the transporting capacity of the user and functions as an elevated stand once onsite.

BRIEF SUMMARY OF THE INVENTION

The present invention is directed at a stand that can elevate a user above the ground at a desired location and also be reconfigured into a two wheel cart (without the removal of the wheels) which can be pulled or pushed by a user or a transporter (like an all terrain vehicle.) The present invention includes a pair of wheels mounted on a "U" shaped split axle assembly wherein a ladder assembly and a pair of legs are each coupled to one of the wheels to form an elevated base when the footings of the ladder assembly and the pair of legs are in contact with the ground. Once the base is erected, a seat is fixed to the inside of the "U" shaped split axle assembly below the free wheel to form a seat assembly (which can be covered). A user gains access to or egresses from the base by the ladder assembly. After using the elevated stand, a user uncouples the legs and ladder assembly from the base and repositions the split axle assembly such that both wheels are in rolling contact with the ground. The ladder assembly is repositioned and fixed to the split axle assembly to form a frame capable of holding cargo, including the detached legs, and simultaneously transferring the load of the cargo to the pair of the wheels via the split axle assembly. The frame is further configured to be held and pushed or pulled by a user or transporter.

DETAILED DESCRIPTION OF THE PREFERRED EMBODIMENTS

Figure 3:
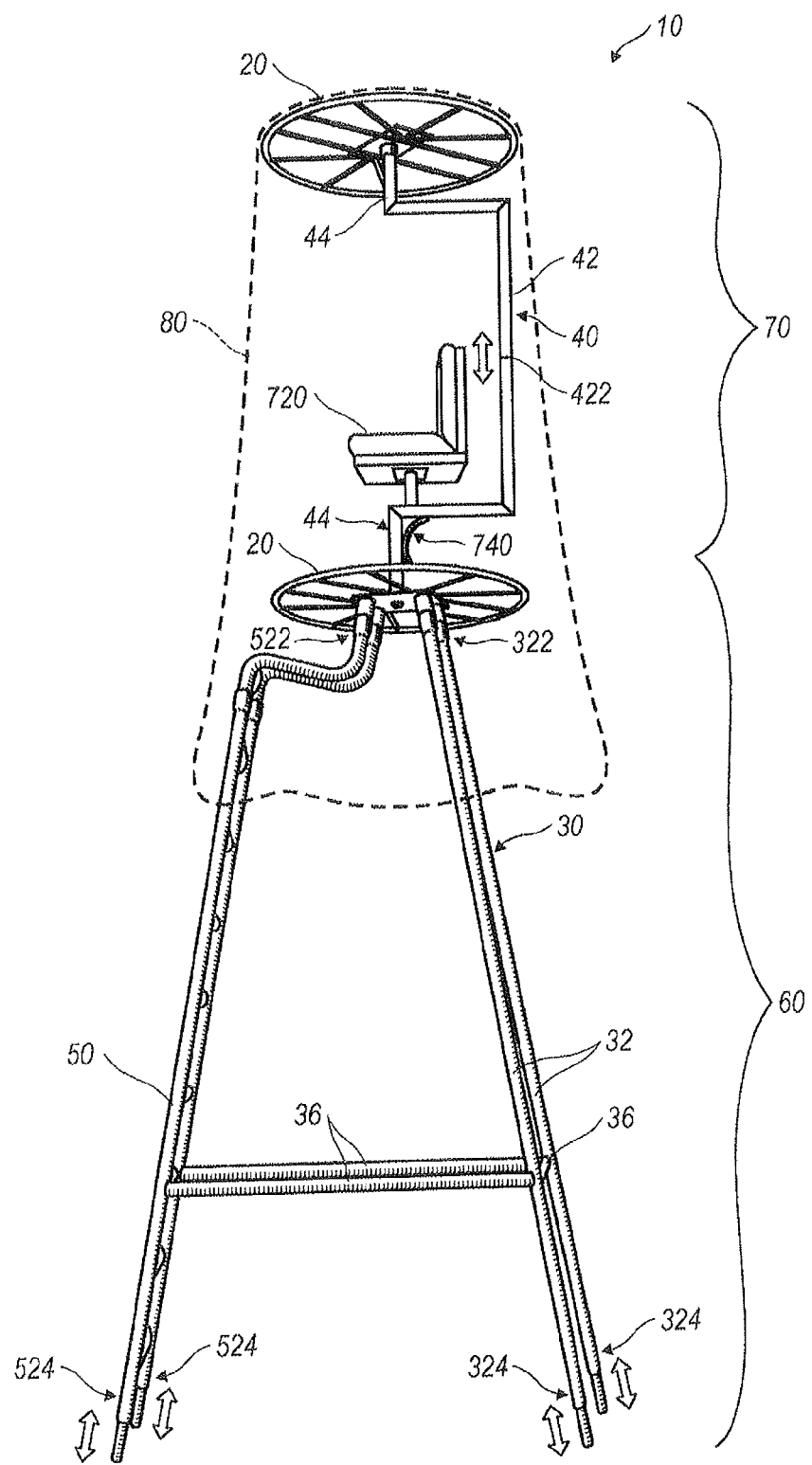
FIG. 3 is a side view of an elevated stand.

Referring to FIG. 3, the present invention is a configurable elevated stand 10 constructed from a ladder assembly 50, a pair of legs 32, a pair of wheel assemblies 20, a plurality of sockets 34, an offset split axle assembly 40 and a seat 720. Configured as an elevated stand 10, the pair of legs 32 and rails 52 of the ladder assembly 50 are coupled at one end 322, 522 to corresponding sockets 34 fixed to the first wheel assembly 20 to form a base 60. The seat 720 is fixed to the split axle assembly 40 to form a seat assembly 70, such that the seat 720 is above base 60. See FIG. 3.

Figure 1:
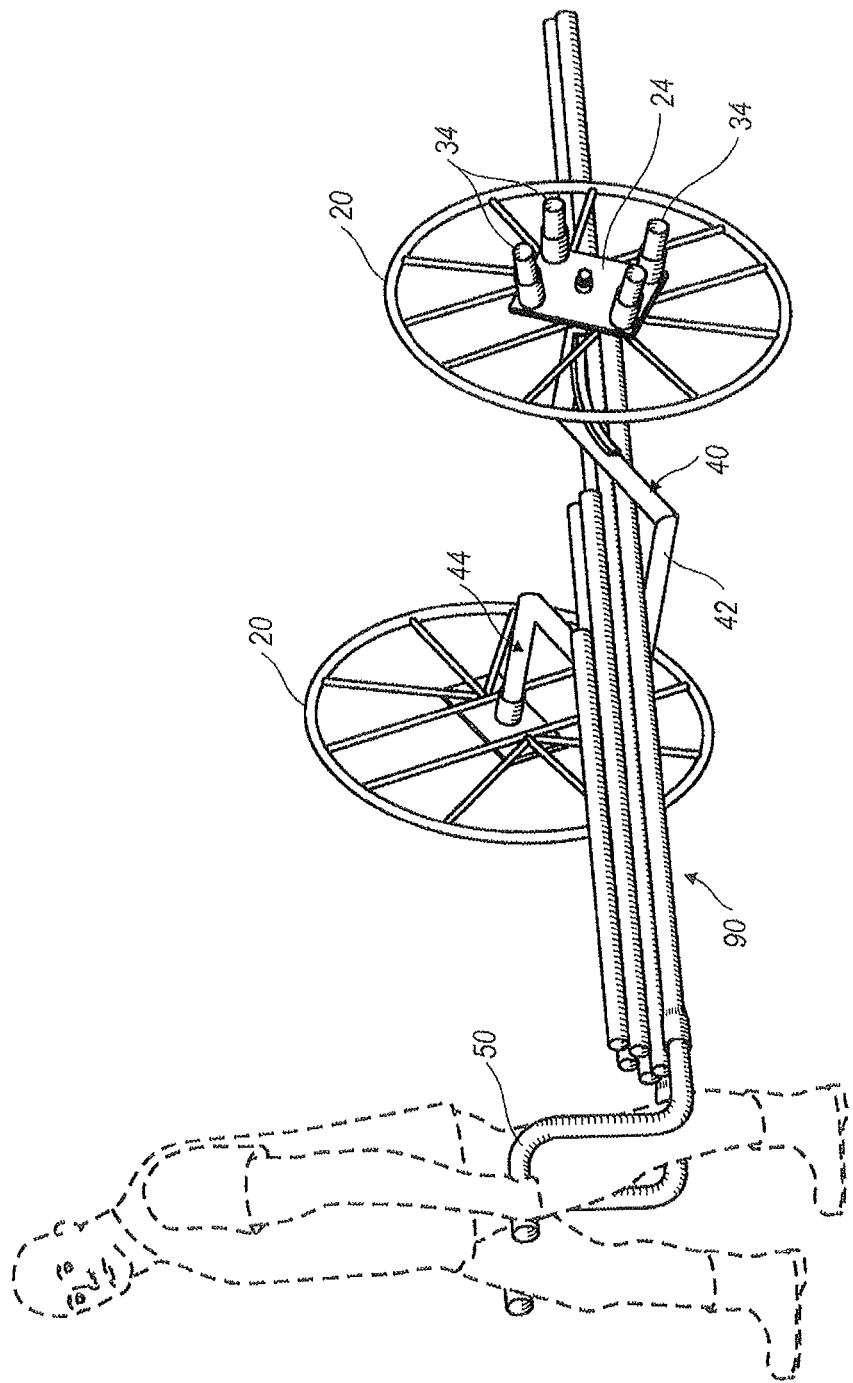
FIG. 1 is a side view of an elevated stand configured as a two wheeled hand cart to transport parts of the elevated stand as well as other items.

As shown in FIG. 1, the elevated stand 10 can be configured into a cart that can be pulled or pushed by repositioning the offset split axle assembly 40 such that the pair of wheel assemblies 20 are in contact with the ground and the ladder assembly 50 repositioned and fixed to the split axle assembly 40 to form a load bearing frame 90 upon which the legs 32 and seat 720, once removed from the elevated stand 10, can be stowed on the load frame 90. Other items can be stowed on and secured to the load bearing frame 90, including but not limited to hunting equipment, photography equipment, camping equipment, and food.

Figure 2:
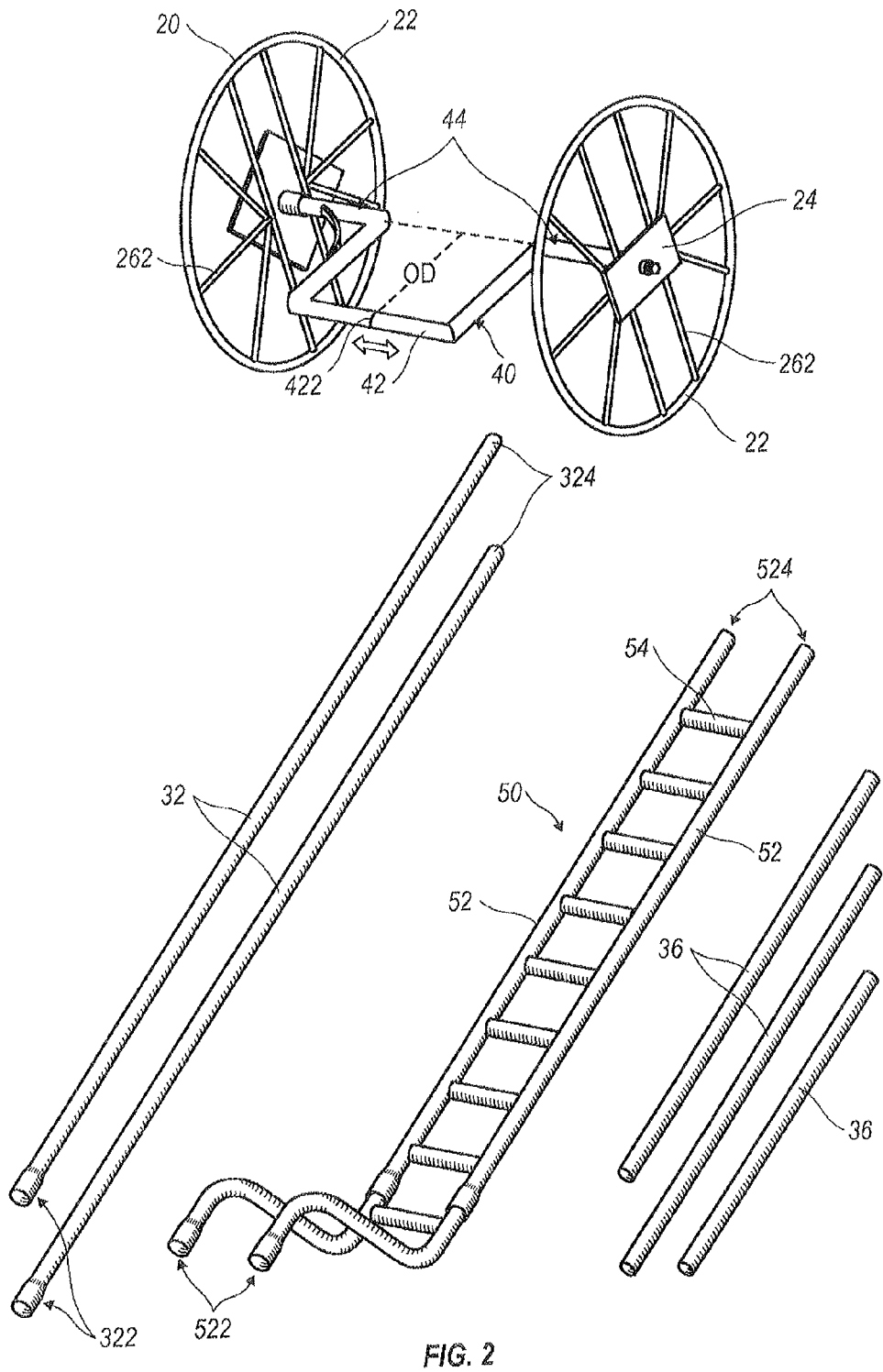
FIG. 2 is a detailed view of the parts that make up an elevated stand, namely a pair of wheels attached to an offset split axle assembly, a pair of legs, a ladder assembly and struts.

The ladder assembly 50 is a plurality of rungs 54 fixed at a user defined interval between two side rails 52. See FIG. 2. A coupling region 522 is located at one end of each side rail 52. A footing region 524 is located at an opposite end of each side rail 52. The plurality of rungs 54 and the side rails 52 can be constructed from steel, aluminum and/or composite tubing and/or solid stock with a polygonal and/or arcurate cross section ranging from approximately 1 inch to approximately 2 inches in outside dimension. In a preferred embodiment, side rails 52 are constructed from approximately 2 inch outer diameter galvanized steel tubing with a circular cross section. In a preferred embodiment, the plurality of rungs 54 are constructed from approximately 1" outer diameter galvanized steel tubing with a circular cross section. The user define interval between the centers of any two adjacent rungs 54 can be approximately 8 inches to approximately 14 inches. In a preferred embodiment, the user defined interval between rungs 54 is approximately 12 inches on center. The width between the centers of the two side rails 52 can be approximately 14 inches to approximately 18 inches. In a preferred embodiment, the width between the centers of the two side rails 52 is approximately 16 inches. The length of a ladder assembly 50 can range between approximately 96 inches to approximately 144 inches. In a preferred embodiment, the length of a ladder assembly 50 is approximately 120 inches.

In a preferred embodiment, the coupling region 522 of each side rail 52 is offset from a longitudinal axis of the ladder assembly 50 to place the plurality of rungs 54 outside a rim 22 of a wheel assembly. See FIG. 3. In another preferred embodiment, the length of each side rail 52 can be adjusted by a user to alter the orientation of base 60 above the ground. In a preferred embodiment, the footing region 524 of each side rail 52 can be lengthen or shortened by conventional means, such as a telescoping joint or a jack screw. See FIG. 3.

Each leg 32 of the pair of legs 30 is fitted with a coupling 322 at one end and a foot 324 at the opposing end. See FIGS. 2 and 3. Each leg 32 can be constructed from steel, aluminum and/or composite tubing and/or solid stock with a polygonal and/or arcurate cross section ranging from approximately 1 inch to 2 inches in outside diameter. In a preferred embodiment, each leg 32 is constructed from approximately 2 inch outer diameter galvanized steel tubing with a circular cross section. The length of a leg 32 can range between approximately 96 inches to approximately 144 inches. In a preferred embodiment, the length of a leg 32 is approximately 144 inches. In a preferred embodiment, the length of each leg 32 can be adjusted by a user to alter the orientation of base 60 above the ground by conventional means, such as a telescoping joint or a jack screw. See FIG. 3.

Figure 4A:
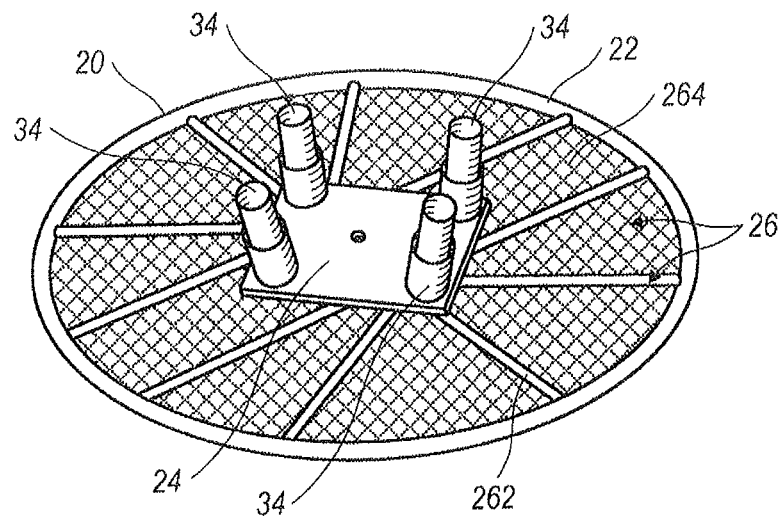
FIG. 4A is an embodiment of a wheel with leg and ladder couplings fixed to a hub.
Figure 4B:
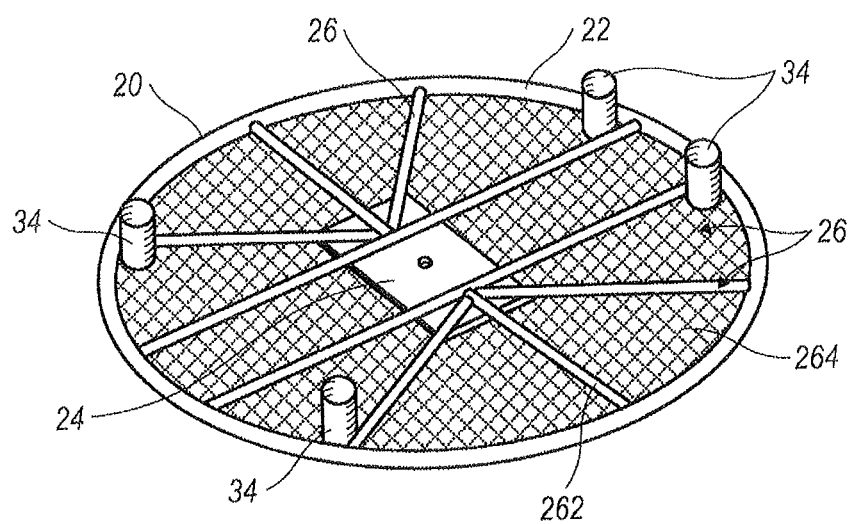
FIG. 4B is an embodiment of a wheel with leg and ladder couplings fixed to an inner portion of a wheel rim.

Each wheel assembly 20 comprises a rim 22 surrounding and fixed to a hub 24 by a support structure 26. See FIGS. 4*a* and 4*b*. Support structure 26 can be spokes 262 and/or grating 264. See FIGS. 4*a* and 4*b*. A plurality of sockets 34 are fixed to one of the wheel assemblies 20 and spaced at a user define distance from the hub 24. In one embodiment, sockets 34 are fixed to the hub 24. See FIGS. 3 and 4*a*. In another embodiment, sockets 34 are fixed to an inner surface of a rim 22. See FIG. 4*b*. Each socket 34 is configured to receive a corresponding coupling 322, 522 of either a leg 32 or a side rail 52. See FIG. 3. The rim 22, hub 24, support structure 26, spokes 262, grating 264 and/or sockets 34 can be constructed from steel, aluminum and/or composite tubing and/or solid stock with a polygonal and/or arcurate cross section. In a preferred embodiment, each wheel assembly includes a rim 22 constructed from solid steel bar with a rectangular cross section; spokes 262 constructed from solid steel bar with a circular cross section; and a hub 24 constructed from solid steel plate. The diameter of a wheel assembly 20 ranges from approximately 38 inches to approximately 40 inches. In a preferred embodiment, the diameter of a wheel assembly 20 is approximately 40 inches.

The pair of wheels 20 are rotatable fixed to the outer ends of a split axle 44. The inner ends of a split axle 44 are fixed to a generally "U" shaped rail 42 to form an offset split axle assembly 40. See FIGS. 1, 2 and 3. The split axle 44 and "U" shaped rail 42 can be constructed from steel, aluminum and/or composite tubing and/or solid stock with a polygonal and/or arcurate cross section ranging from approximately 1½ inches to approximately 2 inches outer dimension. In a preferred embodiment, the split axle 44 and "U" shaped rail 42 are constructed from galvanized steel tubing with a circular cross section having an approximately 2 inch outer diameter. The distance between the pair of wheel assemblies 20 can be adjusted from approximately 36 inches to approximately 72 inches by a telescoping joint 422 formed within the "U" shaped rail 42. In a preferred embodiment, the telescoping joint 422 can be separated to detach the split axles 44 from each other. The offset distance "OD" in the "U" shaped rail 42 may, but preferably should not, exceed the radius of a wheel assembly 20. See FIG. 2. In a preferred embodiment, the offset distance "OD" ranges between approximately 38 inches to approximately 40 inches. In yet another preferred embodiment, the offset distance "OD" is approximately 40 inches when the diameter of a wheel assembly 20 is approximately 48 inches.

A seat 720 is fixed to the "U" shaped rail 42 to form a seat assembly 70 above base 60 with seat 720 above the wheel 20 fitted with sockets 34. In a preferred embodiment, seat 720 is fixed to and within the "U" shaped rail to form a seat assembly above base 60 with seat 720 between said pair of wheels 20. See FIG. 3. In a preferred embodiment, seat 720 swivels. In a preferred embodiment, a stiffening bracket is fixed between the "U" shaped rail 42 and the split axle 44 to at least minimize flexing of the offset split axle assembly 40 when a user sits the seat 720. See FIG. 3.

In a preferred embodiment, a shroud 80 can be draped over the wheel 20 without sockets 34 to at least partially enclose a user from the surroundings. See FIG. 3. Shroud 80 can be made of fabric, mesh, a combination of both and/or any other flexible durable material to at least cover the seat assembly 70. It is further contemplated that slits or covered openings are formed in shroud 80 to allow a user easy access to the seat 720 and/or to extend a gun, camera lens or other device through the shroud 80. In a preferred embodiment, shroud 80 is constructed from a durable cloth with a camouflaged pattern. See FIG. 3.

In a preferred embodiment, struts 36 are fixed between the each side rail 52 of a ladder assembly 50 and said pair of legs and between each leg of said pair of legs. See FIG. 3. The struts 36 provide additional stability to the base 60. Struts 36 can be constructed from steel, aluminum and/or composite tubing and/or solid stock with a polygonal and/or accurate cross section ranging from approximately 1 inch to approximately 1½ inches outer dimension. In a preferred embodiment, the struts 36 are constructed from galvanized steel tubing with a circular cross section of approximately 1½ inches outer diameter. The length of a strut 36 can range from approximately 48 inches to 72 inches. In a preferred embodiment, the length of the struts 36 are approximately 72 inches.

The elevated stand 10 can be configured into a hand cart by repositioning the split axle assembly 40 such that the pair of wheel assemblies 20 are in rolling contact with the ground; and repositioning the ladder assembly 50 to be fixed to said "U" shaped rail 42 to form a load frame 90 upon which the legs 32 and the seat 720, once removed from the elevated stand 10, can be stored on the load frame 90. See FIG. 1. Fixation of ladder assembly 50 to the "U" shaped rail 42 is achieved through conventional fastening means such as bolts and/or pins passing through holes formed in the side rails 52 and "U" shaped rail 42 and secured by nuts, split rings and/or cotter pins.

Although the present invention and its advantages have been described in detail, it should be understood that various changes, substitutions and alterations can be made herein without departing from the spirit and scope of the invention as defined by the claims set forth below.

What is claimed is:

1. A configurable elevated stand comprising:
   a plurality of rungs fixed at a user defined interval between two side rails to form a ladder assembly with a coupling region at one end and a footing region at an opposite end of said ladder assembly;
   a pair of legs, wherein each said leg comprises a coupling at one end and a foot at an opposing end;

a pair of wheel assemblies, wherein each wheel assembly comprises a rim surrounding and fixed to a central hub by a support structure;

a plurality of sockets fixed to one of said wheel assemblies and spaced at user defined distances from said hub to receive said coupling region of said ladder assembly and said couplings of said pair of legs to form a base at a user defined distance above the ground when said footing regions and said feet are in contact with the ground;

a split axle rotatably fixed at outer ends to said central hubs and fixed at inner ends to a generally "U" shaped rail to form an offset split axle assembly; and a seat fixed to and within said "U" shaped rail to form a seat assembly above said base, wherein the elevated stand can be configured into a cart by repositioning said split axle assembly such that said pair of wheel assemblies are in rolling contact with the ground and repositioning said ladder assembly to be fixed to said "U" shaped rail to form a load frame upon which said legs and said seat, once removed from the elevated stand, can be stowed on said load frame.

2. The configurable elevated stand as claimed in claim 1, wherein said plurality of sockets are fixed to an inner surface of said rim.

3. The configurable elevated stand as claimed in claim 1, wherein said plurality of sockets are fixed to said hub.

4. The configurable elevated stand as claimed in claim 1, wherein a said support structure comprises a plurality of spokes radiating from said hub to said rim.

5. The configurable elevated stand as claimed in claim 1, wherein a said support structure comprises grating fixed to said hub and an inner surface of said rim.

6. The configurable elevated stand as claimed in claim 1, wherein a shroud is draped over said seat assembly.

7. The configurable elevated stand as claimed in claim 1, wherein said seat is pivotally secured to said "U" shaped rail.

8. The configurable elevated stand as claimed in claim 1, wherein a stiffening bracket is fixed between said "U" shaped rail and said split axle to at least minimize flexing of said offset split axle assembly when a user sits in said seat.

9. The configurable elevated stand as claimed in claim 1, wherein a plurality of struts are fixed between said side rails and said pair of legs and between each said leg of said pair of legs.

10. The configurable elevated stand as claimed in claim 1, wherein each leg of said pair of legs and each side rail of said ladder assembly can be independently adjusted and fixed to a user defined length to position said base at a user defined orientation above the ground.

11. The configurable elevated stand as claimed in claim 1, wherein a telescopic joint is formed in said "U" shaped rail to vary the distance between said pair of wheel assemblies.

\* \* \* \* \*